Figure 8:
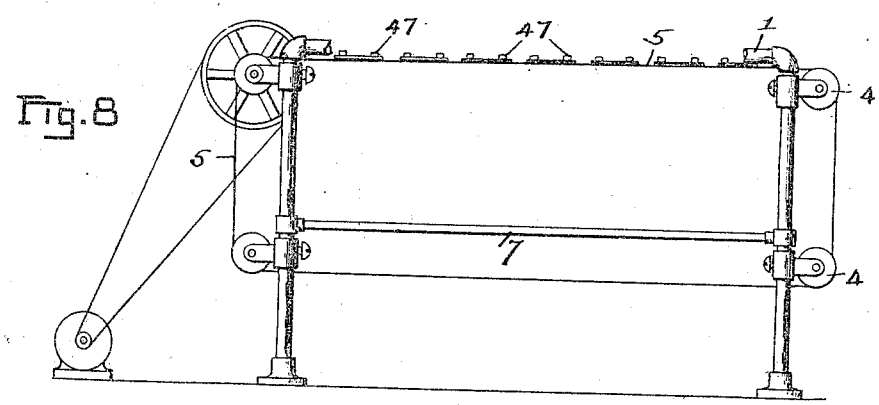

H. LEVISON.
MACHINE FOR TREATING PRINTED MATTER.
APPLICATION FILED JAN. 10, 1912.
1,043,324.
Patented Nov. 5, 1912.
3 SHEETS—SHEET 1.
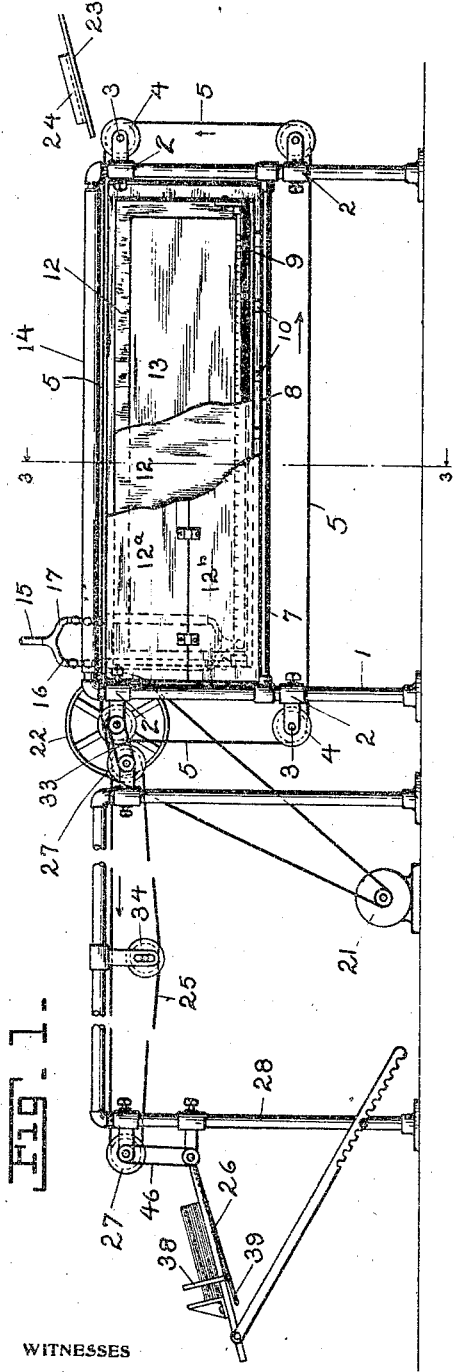
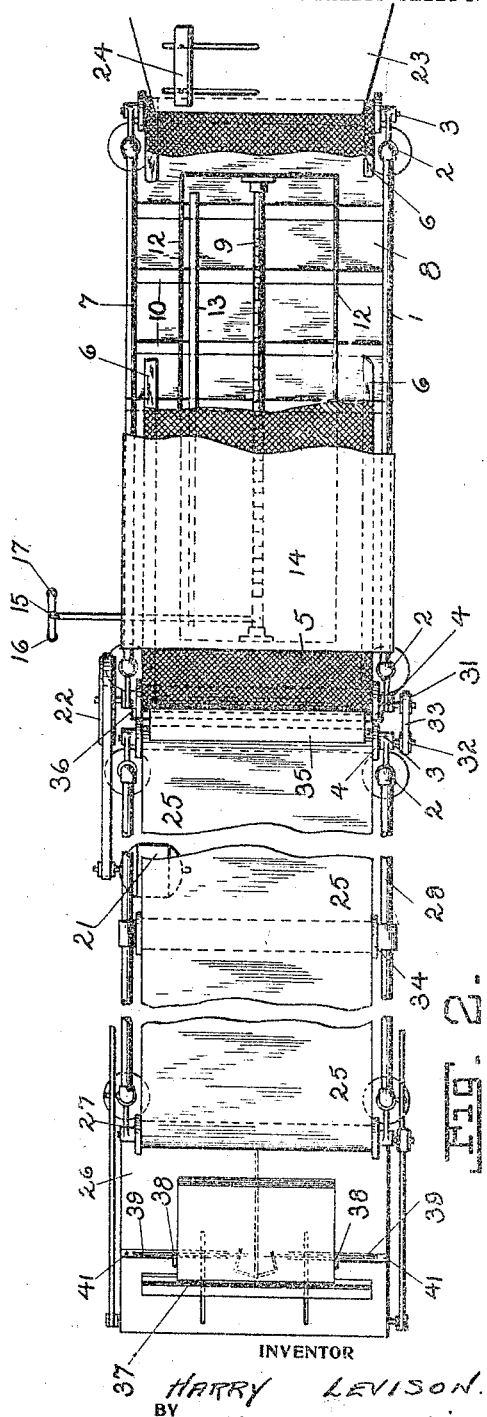
WITNESSES
INVENTOR
HARRY LEVISON.
BY Miller & White
his ATTORNEYS

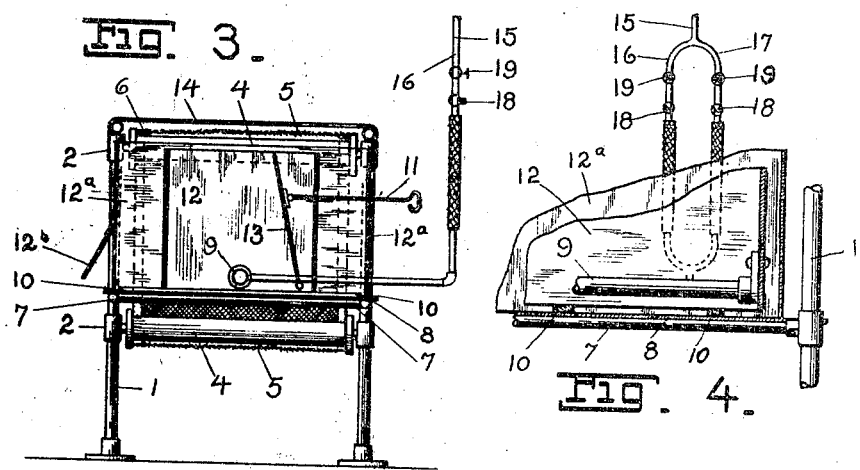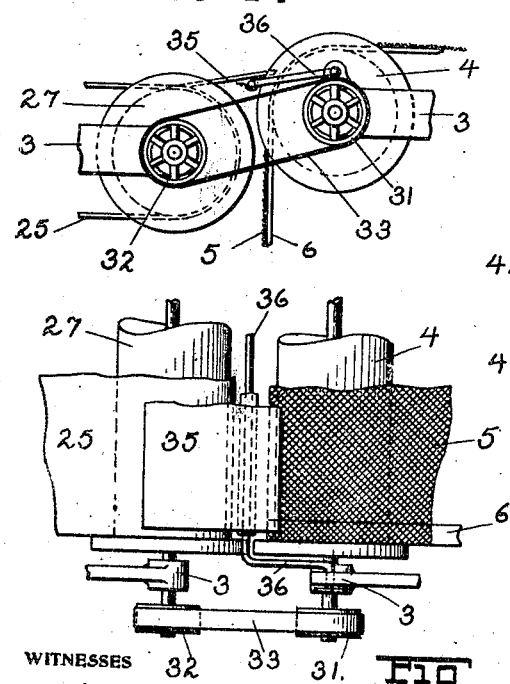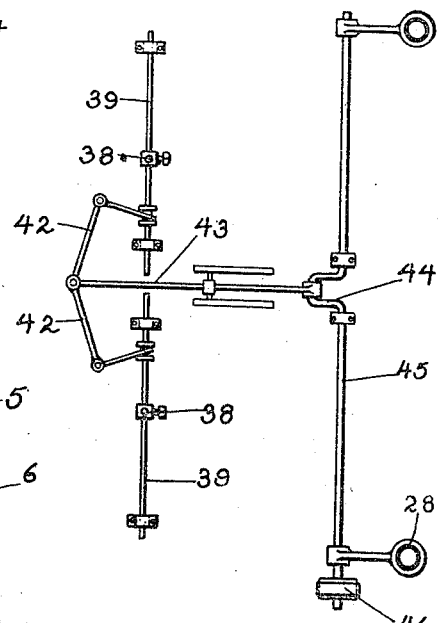

H. LEVISON.
MACHINE FOR TREATING PRINTED MATTER.
APPLICATION FILED JAN. 10, 1912.

1,043,324.

Patented Nov. 5, 1912.

3 SHEETS—SHEET 3.

WITNESSES

INVENTOR
HARRY LEVISON
BY Miller & White
his ATTORNEYS

UNITED STATES PATENT OFFICE.

HARRY LEVISON, OF SAN FRANCISCO, CALIFORNIA.

MACHINE FOR TREATING PRINTED MATTER.

1,043,324.　　　　Specification of Letters Patent.　　Patented Nov. 5, 1912.

Application filed January 10, 1912. Serial No. 670,285.

*To all whom it may concern:*

Be it known that I, HARRY LEVISON, a citizen of the United States, and a resident of the city and county of San Francisco, State of California, have invented certain new and useful Improvements in Machines for Treating Printed Matter, of which the following is a specification.

The invention relates to machines for heating printed matter to produce certain results as will hereinafter be more fully described.

The object of the invention is to provide a machine for continuously and efficiently carrying on the heating or baking operation.

A further object of the invention is to provide an apparatus in which the heat is entirely under the control of the operator both as to distribution and temperature.

A further object of the invention is to provide an apparatus which heats the printed matter, allows it to become cool and after cooling deposits it in a pile or stack.

The apparatus possesses other desirable features, which, with the foregoing, will be set forth at length in the following description where I shall outline in full that form of embodiment of the invention which I have selected for illustration in the drawings accompanying and forming part of the present specification.

The novelty of the invention will be included in the claims succeeding said description. From this it will be apparent that I do not restrict myself to the showing made by such drawings and description, as I may adopt many variations within the scope of my invention as expressed in said claims.

It has been discovered that if a certain powdered preparation be applied to printed matter before the ink has become dry, a portion of the substance will adhere to the ink, completely covering it. If the paper or card is then heated to the required temperature, the preparation is melted and baked so that it adheres firmly to the card or paper and is elevated or raised above the surface of the sheet, producing the same effect as that obtained by engraved copper plates or steel dies.

The present invention embodies a machine or apparatus for heating the sheets, after the powdered preparation has been applied thereto, to the proper temperature for the proper length of time to produce the most efficient results, and then removing them from the heated area and allowing the preparation to cool and harden before they are stacked. The present apparatus also involves other features which will appear hereinafter.

Figure 10:
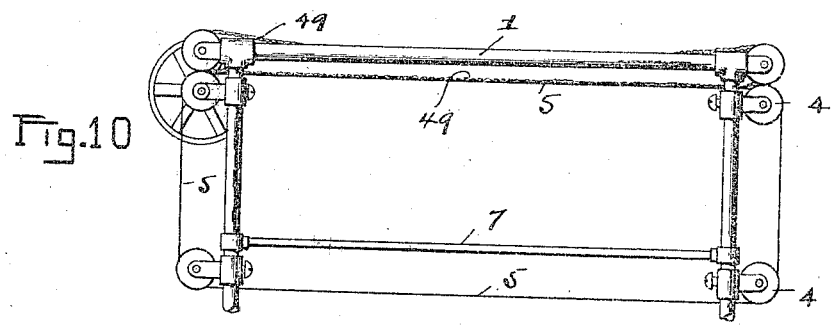
Figure 9:
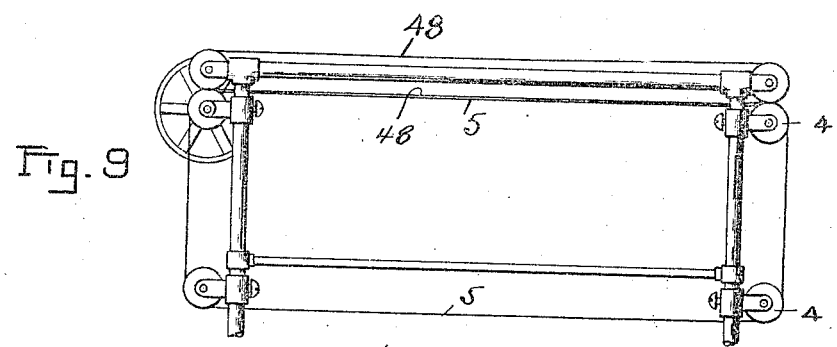
Figure 11:
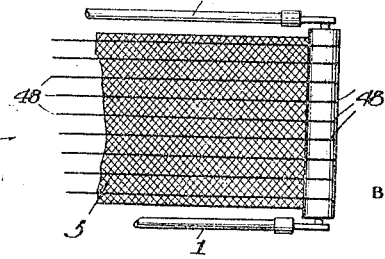

Referring to the drawings:—Figure 1 is a side elevation of the apparatus, part thereof being broken away to reduce the size of the figure; Fig. 2 is a top or plan view of the apparatus as shown in Fig. 1, parts thereof being broken away to disclose the construction of the heating station; Fig. 3 is a cross-section taken on the line 3—3, Fig. 1; Fig. 4 is a detail showing the connection between the burner and the gas supply, when gas is used as fuel; Fig. 5 is a detail of the connection between the heating conveyer and the cooling conveyer; Fig. 6 is a top view of the arrangement shown in Fig. 5; Fig. 7 is a detail of the device for jogging and alining the sheets in a stack as they are delivered from the cooling conveyer. Fig. 8, is a modification of the apparatus in which the sheets are held down by means of weights placed thereon. Fig. 9 is a construction in which the sheets are held in place by a plurality of wires moving in time with the screen. Fig. 10 is a construction in which the sheets are held in place by means of a moving chain. Fig. 11 is a partial top view of the modification shown in Fig. 9.

The apparatus consists of a frame 1 made of any suitable material and shape to best suit the requirements. Arranged upon the frame are adjustable sleeves 2 carrying bearings 3 for the flanged rollers 4, over which a continuous conveyer 5 is adapted to travel. The conveyer 5 is preferably formed of a wire screen having leather belts 6 attached thereto at opposite sides so that the screen may be driven by contact with the driving roller and to cause the screen to remain straight and not become distorted as it travels.

The rollers 4 are arranged external to the frame, the lower rollers being preferably placed below the cross rails 7, upon which is arranged a pan or bed 8 so that the conveyer passes completely around the heating element. Resting upon the rails 7 are a plurality of cross bars 10 upon which rests a heating element, preferably a gas burner 9, inclosed at the sides by a sheet metal box 12, so that all of the heat is directed upward against the screen. The bottom of the box being open and raised above the bed 8, allows sufficient air to enter to properly support combustion. The box 12 is preferably formed narrower than the screen, so that the ascending heat will not impinge upon the leather belts and cause them to become heated to a high temperature.

The box is movable sidewise on the bed 8 so that the heat may be directed to any part of the screen as it passes over the burner 9. Within the box, and preferably pivoted adjacent the bottom part thereof is a deflecting plate 13, controlled by the rod 11, which is provided with teeth which engage the side of the box, so that the deflecting plate may be adjusted and held in any desired position. By the use of this plate 13, the heat may be concentrated at a narrow part of the screen. This arrangement is particularly advantageous when the apparatus is used in connection with sheets which are printed only at one end, or where the printing is confined to a small part of the area, such as letter-heads, or when small matter, such as cards, are to be treated. By the conjoint use of the deflector plate and the shifting of the box, the heat may be confined to any particular part of the screen. In operation I have found that slight variations in temperature due to drafts striking the box or stove 12 have interfered with the proper operation of the apparatus and in order to overcome this, I find it advisable to inclose the space occupied by the stove so that drafts or air currents may not strike it, nor enter directly beneath the conveyer. For this purpose I attach to the frame sheet metal plates 12ª inclosing the space occupied by the stove. One of these plates 12ª I have formed in two sections with the lower part so that access may be had to the interior when desired. This lower part 12ᵇ also serves as a damper and may be opened and held at any desired position to perform its necessary function.

Arranged over the screen, and in close relation thereto and preferably supported by the side rails of the frame is a pan or cover 14, under which the sheets pass. This pan serves as a deflector or buffer for the ascending air current and deflects it outward, thereby overcoming the tendency of the current to lift the sheet from the screen. By serving as a buffer, the air is deflected and the sheet remains stationary on the screen. The cover or pan 14 is flanged or turned down along the sides where it engages the side rails, to hold it in place and to form a bank of air under the cover and prevent the sheets from being blown upward.

When gas is used as a fuel the burner 9 is connected to the supply pipe 15, by one or more conductors 16—17, which branch out from the supply pipe and are brought together again before they enter the burner. Each conductor is provided with two cocks 18—19, one of which is used to adjust the amount of gas flowing to the burner and the other to open and close the gas circuit. The cock 18 may be set to give the required temperature for a certain class of work and the gas is turned on or shut off by the other cock 19. This obviates the necessity of adjusting the burner every time it is lighted. By providing two conductors, I can so adjust the control cocks 18, so that the amount of gas which may pass through one conductor will give the required temperature for treating printed sheets and the other will furnish the necessary amount of gas for treating cards.

The conveyer 5 is driven by the motor 21 belted to a pulley 22, secured to the shaft of one of the rollers 4.

The printed matter is fed to the conveyer from the feed table 23, which is provided with an adjustable gage plate 24, for properly alining the sheets or cards.

After the printed matter has been properly heated it is discharged from the conveyer 5 upon the conveyer 25, upon which it cools before it is stacked upon the table 26. The conveyer 25 is preferably made of a light cloth and travels on rollers 27 mounted upon a frame 28, which may be formed separate from the main frame of the heater. The conveyer 25 is driven from the shaft of one of the rollers 4 by means of the pulleys 31—32 and the belt 33. An idler roller 34, movable vertically in its bearing is employed to maintain the conveyer 25 in tension.

When sheets are being fed through the apparatus they are of sufficient length to easily pass from one conveyer to the other but when cards or similar small stock is used, some supplementary means must be employed for assisting their passage across the gap between the conveyers. For this purpose I employ the plate 35, secured to the bracket 36, which is pivotally attached to the frame of the heater, so that the plate 35 may be moved into or out of operative position. When in operative position the forward end of the plate rests against the conveyer 25 and closes the gap between the conveyers, so that cards may readily pass from one to the other.

As the sheets are discharged from the conveyer 25 they accumulate upon the adjustable table 26, with their forward edges alined by the backing plate 37. At this point it is preferable to employ some means for alining the sheets sidewise. This I accomplish by means of the two fingers 38 which are adjustably attached to the rods 39 and which project upward through slots 41 in the table 26. The rods 39 are given a reciprocating movement by means of the bell-cranks 42 pivoted at the fulcrums to the under side of the table and receiving motion from the rod 43 which is reciprocated by the crank 44 on the shaft 45. This shaft is arranged at the upper end of the table and is preferably driven from the shaft of one of the rollers 27 by the belt 46. The fingers 38 are adjusted to the proper positions for the size of the sheet being operated upon and their continual reciprocating movement causes the sheets to be alined sidewise.

Although I have herein described and illustrated a pan or plate arranged above the conveyer which acts to deflect the air currents and prevent them from dislodging the sheets, it should be understood that other means can be employed for holding the sheets to the conveyer. Instead of deflecting the air currents, they may be allowed to move freely and the sheets may be held in place by weights 47 placed thereon, or a plurality of wires 48 or a chain 49 moving above and in time with the conveyer might be used to accomplish the same result by contacting with the sheets as they are conveyed or moved over the heater.

I claim:—

1. In an apparatus of the character described, a continuous conveyer formed of a metallic screen, a movable heating element arranged below the upper run of said conveyer, and a pan arranged above and in close relation to the upper run of said conveyer in line with the heating element.

2. In an apparatus of the character described, a heating element, a screen conveyer adapted to carry printed matter arranged to travel above said heating element, and means for preventing the heated air currents from dislodging the printed matter as it passes over the heating element.

3. In an apparatus of the character described, a heating element, a screen conveyer arranged to travel above said heating element, a feed table for feeding printed matter to said conveyer, and means for preventing the heated air currents from dislodging the printed matter as it passes over the heating element.

4. In an apparatus of the character described, a conveyer adapted to receive printed matter, a heater below said conveyer, means for preventing the heated air currents from dislodging the printed matter and a second conveyer to receive the printed matter from said first named conveyer.

5. In an apparatus of the character described, a metallic screen conveyer, a transversely movable gas heater arranged below said conveyer, a deflecting plate in said heater and a pan above said conveyer and in close relation thereto.

6. In an apparatus of the character described, a continuous metallic conveyer, a gas heater arranged below said conveyer, means for controlling the heat generated by said heater and a deflecting plate in said heater for concentrating the heat upon a limited area of the conveyer.

7. In an apparatus of the character described, the combination of a continuous reticulated metallic conveyer, arranged to travel on rollers, a gas heater below the upper run of said conveyer, a gas supply pipe, connections between said supply pipe and said heater, each connection being provided with two cocks, one of the cocks in each connection being adjusted to regulate the temperature of the heater.

8. In an apparatus of the character described, a gas burner inclosed in a sheet metal box open at the top and bottom, a frame for supporting said box, a conveyer arranged upon said frame to travel above and in close proximity to said box, and sheet metal plates on said frame inclosing the sides of the space occupied by the box.

9. In an apparatus of the character described, a gas burner inclosed in a sheet metal box open at the top and bottom, a frame for supporting said box, a reticulated metallic conveyer arranged upon said frame to travel above in a close relation to the open upper end of said box, a pan mounted on said frame and lying above and in close relation to said conveyer, and plates attached to the frame and inclosing said box at the sides.

In testimony whereof, I have hereunto set my hand at San Francisco, Cal., this 4th day of January, 1912.

HARRY LEVISON.

In presence of—
  H. G. PROST,
  R. HEFFERNAN.